(12) United States Patent
Keohane et al.

(10) Patent No.: US 7,346,859 B2
(45) Date of Patent: Mar. 18, 2008

(54) ADMINISTRATION OF KEYBOARD INPUT IN A COMPUTER HAVING A DISPLAY DEVICE SUPPORTING A GRAPHICAL USER INTERFACE

(75) Inventors: Susann Marie Keohane, Austin, TX (US); Gerald Francis McBrearty, Austin, TX (US); Shawn Patrick Mullen, Buda, TX (US); Jessica Murillo, Hutto, TX (US); Johnny Meng-Han Shieh, Austin, TX (US)

(73) Assignee: Lenovo Singapore, Ltd., Singapore (SG)

( * ) Notice: Subject to any disclaimer, the term of this patent is extended or adjusted under 35 U.S.C. 154(b) by 737 days.

(21) Appl. No.: 10/815,209

(22) Filed: Mar. 31, 2004

(65) Prior Publication Data
US 2005/0223394 A1 Oct. 6, 2005

(51) Int. Cl.
*G06F 3/033* (2006.01)
*G06F 3/02* (2006.01)

(52) U.S. Cl. ...................... 715/863; 345/168
(58) Field of Classification Search ............... 715/863; 345/173, 168
See application file for complete search history.

(56) References Cited

U.S. PATENT DOCUMENTS

| | | | | |
|---|---|---|---|---|
| 4,264,217 A | | 4/1981 | De Sieno | 400/63 |
| 6,002,862 A | * | 12/1999 | Takaike | 703/17 |
| 6,008,799 A | | 12/1999 | Van Kleeck | 345/173 |
| 6,044,346 A | | 3/2000 | Ali et al. | 704/270 |
| 6,309,305 B1 | | 10/2001 | Kraft | 465/566 |
| 6,535,930 B2 | | 3/2003 | Stern et al. | 709/329 |
| 6,536,666 B1 | | 3/2003 | Hudrick | 235/462.15 |
| 2004/0125153 A1 | * | 7/2004 | Tosey | 345/863 |

\* cited by examiner

*Primary Examiner*—Amr A. Awad
*Assistant Examiner*—Randal L Willis
(74) *Attorney, Agent, or Firm*—H. Artoush Ohanian; C. Munoz Bustamante; Biggers & Ohanian, LLP

(57) ABSTRACT

Administration of keyboard input in a computer having a display device supporting a graphical user interface ("GUI"), including storing keyboard input intended by a user for a second widget when keyboard focus is on a first widget, wherein the first widget receives no keyboard input; changing keyboard focus to the second widget; and providing the stored keyboard input to the second widget.

17 Claims, 3 Drawing Sheets

ADMINISTRATION OF KEYBOARD INPUT IN A COMPUTER HAVING A DISPLAY DEVICE SUPPORTING A GRAPHICAL USER INTERFACE

BACKGROUND OF THE INVENTION

1. Field of the Invention

The field of the invention is data processing, or, more specifically, methods, systems, and products for administration of keyboard input in a computer having a display device supporting a graphical user interface.

2. Description of Related Art

A widget is a graphical user interface ("GUI") component that implements user input for interfacing with software applications and operating systems. 'Widget' is a generic term. In some environments other terms are used for the same thing. In Java environments, for example, widgets are often referred to as 'components.' This disclosure uses the term 'widgets.'

Widgets display information and invite a user to act in a number of ways to input data to a program. Examples of widgets include buttons, dialog boxes, pop-up windows, pull-down menus, icons, scroll bard, resizable window edges, progress indicators, selection boxes, windows, tear-off menus, menu bars, toggles switches, checkboxes, and forms. The term 'widget' also refers to the underlying software program that displays the graphic component of the widget in a GUI look and operates the widget, depending on what action the user takes while operating the GUI in response to the widget. That is, 'widget,' depending on context, refers to a GUI component, a software program controlling a GUI component, or to both the component and the program.

A GUI typically supports multiple windows. Each window will receive input from a keyboard, a mouse, and other user input devices, but only one window may receive input at any one time. The window currently receiving user input is said to have the input focus. The term 'input focus' is generic, but it is often used interchangeably with the term 'keyboard focus.' This disclosure generally uses the term 'keyboard focus,' or, more simply, just 'focus.' In fact, when a window has the focus, input data is actually sent to a widget operating in the window. Just as a GUI supports many windows, each window may include many widgets, only one of which can receive input at any particular time. The widget presently receiving input also is said to have the focus. Focus is often set or changed under express user control. The tab and shift-tab keys are often used in GUIs to move focus from widget to widget in a circular per-window list. A user mouseclick or other direct widget selection such as a stylus press on a touch-sensitive GUI screen is often used to move focus to a widget or to a window.

It is common that a user shifts focus to a window with no way of controlling which widget will get the focus. When a user can use Alt-Tab in some GUIs to shift focus among windows, it is the window that gains focus that decides which widget get focus. Similarly, when a user move focus to a window by running a new application in a new window, again it is the window that gains focus that decides which widget get focus. The window's rules or mechanisms for deciding which widget gets focus are referred to in this specification as a 'policy.' Such policies can be complex, such as, for example, rules for selecting a widget for focus when a window contains a browser screen displaying many widgets that display advertisements and operate hyperlinks to web sites of advertisers who have paid to have their widget preferred for first focus in dependence upon frequency, most recent focus, fee amounts, and so on.

The fact that a window's focus policy determines which widget gets first focus when the window gains focus can give rise to some user frustration. Sometimes a user navigates a browser to a web page, such as a search engine site, for example, that the user knows to requires some user input, search keywords, for example, When the screen comes up on the computer display, the user types a keyword and presses Enter. Nothing happens. The user looks up to find that the window set focus to an advertisement instead the pertinent text entry widget. The user's typed input is lost. For this reason, at least, there is room for improvement in the administration of keyboard input in computer systems with GUIs.

SUMMARY OF THE INVENTION

Methods, systems, and computer program products are disclosed for administration of keyboard input in a computer having a display device supporting a graphical user interface ("GUI"). In a typical embodiment, the GUI includes a multiplicity of windows, and the embodiment includes directing keyboard focus to a window having a keyboard focus policy and a multiplicity of widgets including the first widget and the second widget and directing keyboard focus to the first widget in dependence upon the keyboard focus policy of the window.

Typical embodiments include storing keyboard input intended by a user for a second widget when keyboard focus is on a first widget, wherein the first widget receives no keyboard input. Storing keyboard input intended by a user for a second widget when keyboard focus is on a first widget typically includes reading keyboard input through a keyboard device driver. Storing keyboard input intended by a user for a second widget when keyboard focus is on a first widget typically includes a keyboard device driver's reading input data from a keyboard, including reading the input in the absence of a read request for the keyboard device driver.

Typical embodiments include changing keyboard focus to the second widget. Changing keyboard focus typically includes changing keyboard focus in response to the user's manipulating at least one user input device. Changing keyboard focus to the second widget may include a read instruction directed to a keyboard device driver.

Typical embodiments include prompting the user for an indication whether to provide the stored keyboard input to the second widget, including receiving the indication in response to the prompting. Typical embodiments also include providing the stored keyboard input to the second widget in dependence upon the indication. In some embodiments, changing keyboard focus to the second widget includes a keyboard device driver's receiving a request for keyboard input data; receiving the indication in response to the prompting includes the keyboard device driver's receiving an indication to provide the stored keyboard input to the second widget; and providing the keyboard input to the second widget in dependence upon the indication includes the keyboard device driver's returning the stored keyboard input to the requesting application.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for administration of keyboard input in a computer having a display device supporting a graphical user interface. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Administration of Keyboard Input Intended by a User for a Second Widget when Keyboard Focus is on a First Widget Embodiments of the present invention generally include methods, systems, and products for administration of keyboard input in a computer having a display device supporting a GUI. Embodiments operate generally by storing keyboard input intended by a user for a second widget when keyboard focus is on a first widget, changing keyboard focus to the second widget, prompting the user for an indication whether to provide the stored keyboard input to the second widget, and providing the stored keyboard input to the second widget according to the user's indication.

The term "computer," in this specification, refers to any automated computing machinery. The term "computer" therefore includes not only general purpose computers such as laptops, personal computer, minicomputers, and mainframes, but also devices such as personal digital assistants ("PDAs"), network enabled handheld devices, internet-enabled mobile telephones, and so on.

Figure 1:
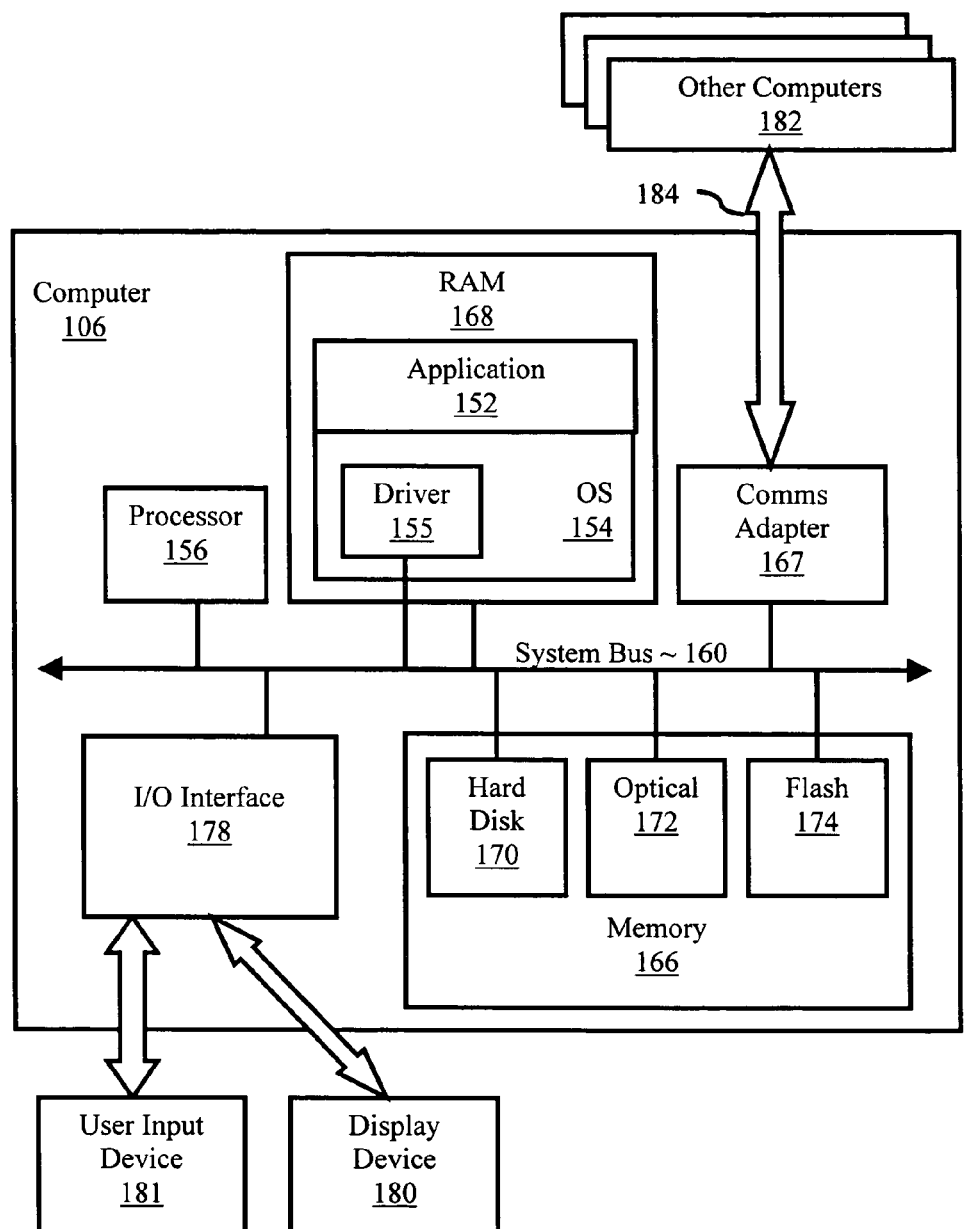
FIG. 1 sets forth a block diagram of automated computing machinery comprising a computer (106) useful according to various embodiments of the present invention.

FIG. 1 sets forth a block diagram of automated computing machinery comprising a computer (106) useful according to various embodiments of the present invention. The computer (106) of FIG. 1 includes at least one computer processor (156) or 'CPU' as well as random access memory (168) ("RAM"). Stored in RAM (168) is an application program (152). Application programs useful in accordance with various embodiments of the present invention include browsers, word processors, spreadsheets, database management systems, email clients, TCP/IP clients, and so on, as will occur to those of skill in the art. When computer (106) is operated as an email client, application (152) includes email client application software. When a computer like computer (106) is operated as a browser, application (152) includes browser application software. Examples of email application software include Microsoft's Outlook™, Qualcomm's Eudora™, and Lotus Notes™. Examples of browser application software include Microsoft Outlook™, Netware Netscape™, and NCSA Mosaic™.

Also stored in RAM (168) is an operating system (154). Operating systems useful in computers according to embodiments of the present invention include Unix, Linux™, Microsoft NT™, and others as will occur to those of skill in the art. Transport and network layer software clients such TCP/IP clients are typically provided as components of operating systems, including Microsoft Windows™, IBM's AIX™, Linux™, and so on. In the example of FIG. 1, operating system (154) also includes at least one device driver (155) for use in input/output communications among applications (152), user input devices (180), and display devices (180). Examples of display devices include GUI screens, text screens, touch sensitive screens, Braille displays, and so on. Examples of user input devices include mice, keyboards, numeric keypads, touch sensitive screens, microphones, and so on.

The example computer (106) of FIG. 1 includes computer memory (166) coupled through a system bus (160) to the processor (156) and to other components of the computer. Computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art. The example computer (106) of FIG. 1 includes communications adapter (167) that implements connections for data communications (184) to other computers (182). Communications adapters (167) implement the hardware level of data communications connections through which client computers and servers send data communications directly to one another and through networks. Examples of communications adapters (167) include modems for wired dial-up connections, Ethernet (IEEE 802.3) adapters for wired LAN connections, 802.11 adapters for wireless LAN connections, and Bluetooth adapters for wireless microLAN connections.

The example computer of FIG. 1 includes one or more input/output interface adapters (178). Input/output interface adapters (178) in computer (106) include hardware that implements user input/output to and from user input devices (181) and display devices (180). In the example of FIG. 1, applications (162) effect user-oriented input/output through operating system device drivers (155) which in turn communicate with user input devices and display devices through one or more input/output interface adapters (178). In particular, a keyboard device driver is an example of a device driver (155) that reads keyboard input from a user input device (181) represented as a keyboard through an input/output interface adapter (178) when requested to do so by an application (152).

Application software (152) and operating systems (154), including particularly device drivers (155), may be altered to implement embodiments of the present invention by use of plug-ins, kernel extensions, or modifications at the source code level in accordance with embodiments of the present invention. Alternatively, completely new applications or operating system software, including particularly keyboard drivers, may be developed from scratch to implement embodiments of the present invention. A device driver (155), particularly a keyboard device driver, implemented according to an embodiment of the present invention, may store in a buffer in RAM (168) keyboard input intended by a user for a second widget when keyboard focus is on a first widget. Such a device driver may prompt the user, when focus changes to the second widget, for an indication whether to provide the stored keyboard input to the second widget by displaying a prompt on a user display device (181) such as a GUI screen. Such a device driver may determine that the second widget has acquired focus because an application (152) representing the second widget requests input from the device driver (155). Such a device driver may provide the stored keyboard input to the second widget by reading the stored keyboard back from its RAM buffer and returning it to the widget in response to the widget's request for keyboard input.

Figure 2:
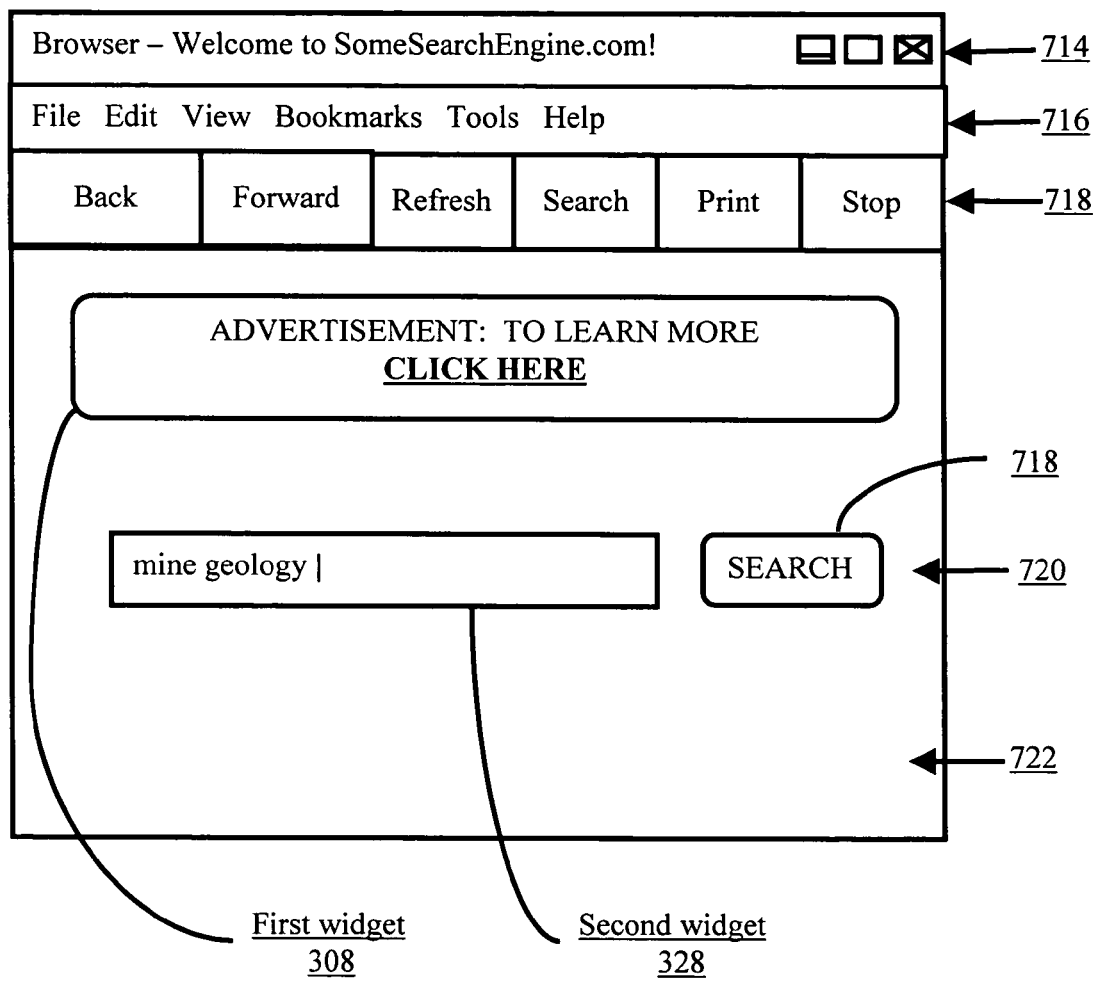
FIG. 2 sets forth a line drawing that depicts an exemplary GUI on a computer running a data communication application, that is, a browser.

For further explanation, an exemplary use case is discussed with reference to FIG. 2. FIG. 2 sets forth a line drawing that depicts an exemplary GUI on a computer running a data communication application, more particularly, in the example of FIG. 2, a browser. The browser of FIG. 2, as depicted, has been operated by a user to point to a web site named "SomeSearchEngine.com," as shown in the title bar of the browser display (714). The browser of FIG. 2 includes a GUI toolbar (718) with a Back button, a Forward button, and buttons for refreshing the display, searching, printing, and stopping web page retrievals. The browser of FIG. 2 also includes a horizontal menu (716) containing the menu items File, Edit, View, Bookmark (sometimes called 'Favorites'), Tools, and Help. The browser of FIG. 2 displays a search query, "mine geology," displayed in a query entry field (732). In the exemplary use case, the user ceased operations just before invoking the search feature (718) of the search engine, so that the area of the GUI screen in which search results are displayed is still empty (722).

In this example, when the browser first displayed the web page for the search engine, input focus was directed a first widget (308). In this example, the first widget (308) is an advertisement that support only a single hyperlink labeled "CLICK HERE." The hyperlink will respond to a mouseclick, but the first widget neither requests nor accepts keyboard input. The user, wishing to read about mining and geology, when the search engine web page is displayed, begins typing on a keyboard, typing the words "mine geology" as search keywords. Because input focus is on the first widget and the first widget accepts no keyboard input, the user's typing would be lost on a prior art computer. In this example, however, the user is operating the browser on a computer having an operative keyboard device driver implemented according to an embodiment of the present invention to buffer keyboard input until a second widget gains focus.

In this example, the second widget (328) is the text entry field for the search engine. The user typed "mine geology." Then the user glanced at the display and realized that the text entry field did not have keyboard focus while the user was typing. The user mouseclicked the text entry field (328) to place focus there. The text entry field widget (328) then requested keyboard input from the keyboard device driver. The keyboard device driver at that moment had a non-empty RAM buffer containing the text "mine geology." The keyboard device driver displayed a prompt on the GUI screen:

Enter "mine geology"? (Y/N): _____

The user tapped the 'Y' key on the keyboard, and the keyboard device driver returned "mine geology" to the text entry field widget (328). The text entry field widget (328) then displayed "mine geology" in its text entry field and placed a carat at the end of the string waiting for further keyboard input. That is how the GUI screen came to have the appearance shown in FIG. 2.

That fact the exemplary application of FIG. 2 is represented as a browser is not a limitation of the present invention. On the contrary, many applications that implement shifting input focus among widgets are useful in various embodiments of the present invention, including email clients, word processors, database applications such as are used by personal digital assistants ("PDAs"), and so on. The use of all such applications, and others as will occur to those of skill in the art, is well within the scope of the present invention.

Figure 3:
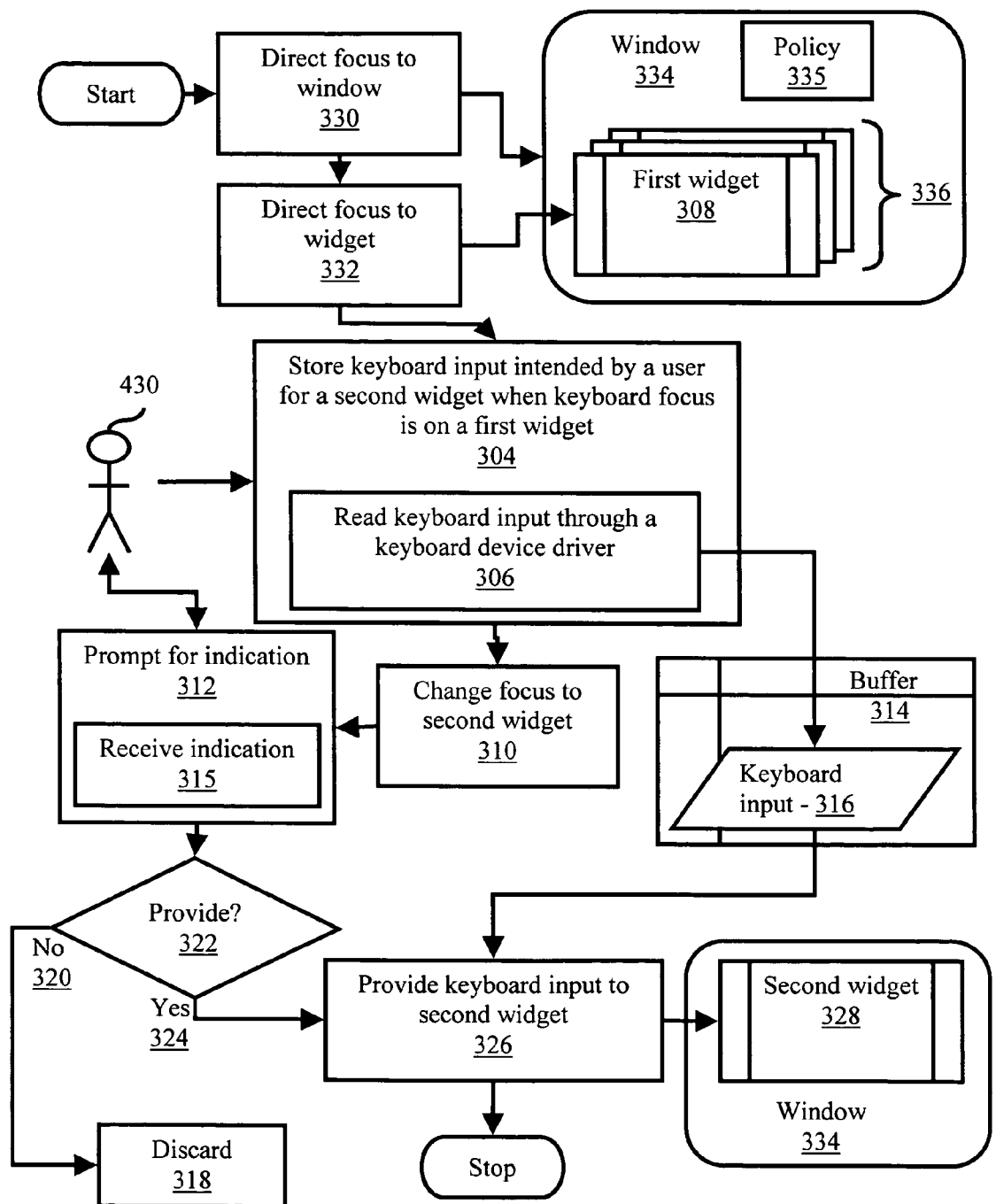
FIG. 3 sets forth a flow chart illustrating an exemplary method for administration of keyboard input in a computer having a display device supporting a GUI.

For still further explanation, FIG. 3 sets forth a flow chart illustrating an exemplary method for administration of keyboard input in a computer having a display device supporting a GUI. The method of FIG. 3, in which a GUI typically includes a multiplicity of windows, typically includes directing (330) keyboard focus to a window (334). In the example of FIG. 3, the window to which focus is directed has a keyboard focus policy (335) and a multiplicity of widgets (336), including a first widget (308) and a second widget (328). Directing keyboard focus to a window may be accomplished by opening an application in a new window, Alt-tabbing from one window to another, and so on. The method of FIG. 3 also typically includes directing (332) keyboard focus to the first widget (308) in dependence upon the keyboard focus policy (335) of the window (334).

Keyboard focus in the example of FIG. 3 is characterized by a focus policy. A focus policy is a specific mechanism or set of rules for moving focus among windows and widgets. The focus policy can be different between windows than it is within windows, that is, among widgets within a window. Focus policy for widgets within a window include rules for which widget gets focus when window gains focus and no user action has yet occurred to explicitly place focus on any particular widget. An example of such a rule is: place focus on the first widget displayed. Examples of user actions that may explicitly place focus among widgets include TAB keypresses, mouseovers, and mouseclicks.

The method of FIG. 3 includes storing (304) keyboard input intended by a user (430) for a second widget (328) when keyboard focus is on a first widget (308). In the example of FIG. 3, the first widget (308) is one that receives no keyboard input. In the method of FIG. 3, storing (304) keyboard input intended by a user for a second widget when keyboard focus is on a first widget is typically carried out by reading (306) keyboard input through a keyboard device driver. The keyboard device driver for standard input is an example of a device driver workable with embodiments of the present invention. In this example, a keyboard device driver associated with 'standard input' is automatically opened by the operating system for all processes. Moreover, the keyboard device driver for standard input is advantageously open across more than one widget so that buffering can be carried out.

In the method of FIG. 3, storing (304) keyboard input intended by a user for a second widget when keyboard focus is on a first widget further is typically carried out by a keyboard device driver's reading input data from a keyboard. In the method of FIG. 3, the keyboard device driver advantageously continues to read the input even in the absence of a read request for the keyboard device driver. This method is advantageous in that the fact that the keyboard device driver reads the keyboard even when there is no application request for keyboard input enables the keyboard device driver to buffer all the keyboard input, including the keyboard input generated before a widget that wants keyboard input gains focus.

The method of FIG. 3 includes changing (310) keyboard focus to the second widget (328). In the method of FIG. 3, changing (310) keyboard focus is often accomplished by changing keyboard focus in response to the user's manipulating at least one user input device. Changing focus to the second widget may be carried out, for example, by mouse-clicking the second widget, by keyboard TABbing focus to the second widget, or by use of other user input devices as will occur to those of skill in the art. The method of FIG. 3 includes prompting (312) the user for an indication whether to provide the stored keyboard input to the second widget. In the method of FIG. 3, prompting (312) the user for an indication includes receiving (135) the indication in response to the prompting. For example, in response to the prompt:

Enter stored keyboard input? Your response (Y/N):
    _____ a user may tap the 'Y' key on the keyboard as an indication to provide the stored keyboard input to the second widget. The user's indication may be represented in computer data as the character 'Y,' as a numeric code, ASCII or Unicode, corresponding to the character 'Y,' as a Boolean indication of 'True,' as a '1,' or otherwise as will occur to those of skill in the art.

In some embodiments of the kind illustrated in FIG. 3, changing (310) keyboard focus to a second widget may be carried out by a keyboard device driver's receiving a request for keyboard input data. In such embodiments, receiving (315) the indication in response to the prompting may include the keyboard device driver's receiving an indication to provide the stored keyboard input to the second widget. In the method of FIG. 3, changing (310) keyboard focus to the second widget is represented by a read instruction directed to a keyboard device driver. That is, when the second widget gains focus, the widget issues a read instruction to the keyboard device driver, and the keyboard device driver treats the read instruction as an indication that the widget now has focus. In some implementations, the keyboard device driver may not know which widget has focus, but the keyboard device driver does know that the widget with focus now wishes to have input from the keyboard. The read instruction may be issued at a high level of functionality represented by character input functions in high level programming languages. Examples of such instructions include "cin >>aChar" in C++, "System.in.read( )" in Java, "get-charo( )" in C, and "$input=<STDIN>" in Perl. Alternatively, such a read instruction may be issued at a lower level of function, including direct calls to a keyboard device driver, as in the following example in C:

char c;

int n=read(0, &c, 1);

where '&c' represents the memory address of the character 'c,' '0' represents the file descriptor of the keyboard device driver associated with standard input, and '1' represents the number of characters to read from keyboard input. The read( ) function stores transferred data in the address indicated by its second parameter and returns an integer indicating the number of bytes read. These two lines of code read a single keyboard input character directly from the keyboard device driver associated with standard input for a software application, process, or, in particular, a widget.

The method of FIG. 3 includes providing (322) the stored keyboard input to the second widget in dependence upon the user's indication whether to do so. Providing (326) the keyboard input to the second widget in dependence upon the indication may be carried out by the keyboard device driver's returning the stored keyboard input (316) to the requesting application. In the example of FIG. 3, storing keyboard input intended by a user for a second widget when keyboard focus is on a first widget is carried out by storing the keyboard input in a buffer (314) until keyboard focus changes to the second widget. That is, in this example, in response to the call "read(0, &c, 1)," so long as there remains data in the buffer (314), a keyboard device driver programmed according to an embodiment of the present invention returns keyboard data from the buffer rather than reading new characters directly from the keyboard. After the buffer is emptied, in response to further requests for keyboard input, such a keyboard device driver then takes input from the keyboard in the usual way.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for administration of keyboard input in a computer having a display device supporting a graphical user interface ("GUI"), the method comprising:
   storing keyboard input intended by a user for a second widget when keyboard focus is on a first widget, wherein the first widget receives no keyboard input;
   changing keyboard focus to the second widget;
   prompting the user for an indication whether to provide the stored keyboard input to the second widget, including receiving the indication in response to the prompting; and
   providing the stored keyboard input to the second widget in dependence upon the indication.

2. The method of claim 1 wherein:
   changing keyboard focus to the second widget further comprises a keyboard device driver's receiving a request for keyboard input data;
   receiving the indication in response to the prompting further comprises the keyboard device driver's receiving an indication to provide the stored keyboard input to the second widget; and providing the keyboard input to the second widget in dependence upon the indication further comprises the keyboard device driver's returning the stored keyboard input to the requesting application.

3. The method of claim 1 wherein storing keyboard input intended by a user for a second widget when keyboard focus is on a first widget further comprises reading keyboard input through a keyboard device driver.

4. The method of claim 1 wherein storing keyboard input intended by a user for a second widget when keyboard focus is on a first widget further comprises a keyboard device driver's reading input data from a keyboard, including reading the input in the absence of a read request for the keyboard device driver.

5. The method of claim 1 wherein changing keyboard focus further comprises changing keyboard focus in response to the user's manipulating at least one user input device.

6. The method of claim 1 wherein the GUI includes a multiplicity of windows, the method further comprising:
   directing keyboard focus to a window having a keyboard focus policy and a multiplicity of widgets including the first widget and the second widget; and
   directing keyboard focus to the first widget in dependence upon the keyboard focus policy of the window.

7. A system for administration of keyboard input in a computer having a display device supporting a graphical user interface ("GUI"), the system comprising:
   means for storing keyboard input intended by a user for a second widget when keyboard focus is on a first widget, wherein the first widget receives no keyboard input;
   means for changing keyboard focus to the second widget;
   means for prompting the user for an indication whether to provide the stored keyboard input to the second widget, inctuding receiving the indication in response to the prompting; and
   means for providing the stored keyboard input to the second widget in dependence upon the indication.

8. The system of claim 7 wherein:
   means for changing keyboard focus to the second widget further comprises means for receiving a request for keyboard input data;
   means for receiving the indication in response to the prompting further comprises means for receiving an indication to provide the stored keyboard input to the second widget; and
   means for providing the keyboard input to the second widget in dependence upon the indication further comprises means for returning the stored keyboard input to the requesting application.

9. The system of claim 7 wherein means for storing keyboard input intended by a user for a second widget when keyboard focus is on a first widget further comprises means for reading keyboard input through a keyboard device driver.

10. The system of claim 7 wherein means for storing keyboard input intended by a user for a second widget when keyboard focus is on a first widget further comprises means for reading input data from a keyboard, including means for reading the input in the absence of a read request for the keyboard device driver.

11. The system of claim 7 wherein means for changing keyboard focus further comprises means for changing keyboard focus in response to the manipulation of at least one user input device.

12. The system of claim 7 wherein the GUI includes a multiplicity of windows, the system further comprising:
   means for directing keyboard focus to a window having a keyboard focus policy and a multiplicity of widgets including the first widget and the second widget; and
   means for directing keyboard focus to the first widget in dependence upon the keyboard focus policy of the window.

13. A computer program product for administration of keyboard input in a computer having a display device supporting a graphical user interface ("GUI"), the computer program product having recorded upon it computer program instructions capable of:
   storing keyboard input intended by a user for a second widget when keyboard focus is on a first widget, wherein the first widget receives no keyboard input;
   changing keyboard focus to the second widget;
   prompting the user for an indication whether to provide the stored keyboard input to the second widget, including receiving the indication in response to the prompting; and
   providing the stored keyboard input to the second widget.

14. The computer program product of claim 13 wherein storing keyboard input intended by a user for a second widget when keyboard focus is on a first widget further comprises reading keyboard input through a keyboard device driver.

15. The computer program product of claim 13 wherein storing keyboard input intended by a user for a second widget when keyboard focus is on a first widget further comprises reading input data from a keyboard, including reading the input in the absence of a read request for the keyboard device driver.

16. The computer program product of claim 13 wherein changing keyboard focus further comprises changing keyboard focus in response to the manipulation of at least one user input device.

17. The computer program product of claim 13 wherein the GUI includes a multiplicity of windows, the computer program product also having recording upon it computer program instructions capable of:
   directing keyboard focus to a window having a keyboard focus policy and a multiplicity of widgets including the first widget and the second widget; and
   directing keyboard focus to the first widget in dependence upon the keyboard focus policy of the window.

* * * * *